[12] United States Patent
Subrahmanya et al.

(10) Patent No.: US 7,583,756 B2
(45) Date of Patent: *Sep. 1, 2009

(54) ADAPTIVE PILOT FILTER FOR A WIRELESS COMMUNICATION SYSTEM

(75) Inventors: Parvathanathan Subrahmanya, Sunnyvale, CA (US); Da-shan Shiu, San Jose, CA (US); Avneesh Agrawal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/761,329

(22) Filed: Jun. 11, 2007

(65) Prior Publication Data

US 2007/0230544 A1 Oct. 4, 2007

Related U.S. Application Data

(63) Continuation of application No. 09/924,199, filed on Aug. 7, 2001, now Pat. No. 7,230,975.

(51) Int. Cl.
*H04L 27/00* (2006.01)
*H04B 1/10* (2006.01)
*H04L 23/00* (2006.01)

(52) U.S. Cl. .................. 375/316; 375/350; 375/377

(58) Field of Classification Search ............ 375/147, 375/148, 350, 130, 140, 144, 145, 149, 316, 375/377, 229–233, 285

See application file for complete search history.

(56) References Cited

U.S. PATENT DOCUMENTS 5,056,109 A 10/1991 Gilhousen et al.

(Continued)

FOREIGN PATENT DOCUMENTS

EP 0901239 3/1999

(Continued)

OTHER PUBLICATIONS

Shen, Q., et al., "The Linear Prediction Method of Fading Channel Estimation for the Rake Receiver with Impulsive Interference" Wireless Personal Communications, Klijwer Academic Publishers, NL vol. 6:3. p. 233-248 (1998).*

(Continued)

*Primary Examiner*—Tesfaldet Bocure
(74) *Attorney, Agent, or Firm*—Kenneth K. Vu; Larry J. Moskowitz (57) ABSTRACT

Techniques to filter pilot symbols for a pilot in an "adaptive" manner to provide an improved estimate of the response of a communication channel. A received signal may experience different channel conditions at different times, and different multipaths may also experience different channel conditions even when received close in time. A pilot filter with an adaptive response is used to provide an improved estimate of the channel response. Various adaptive pilot filtering schemes may be used. In a first scheme, the channel conditions are estimated based on the quality of the received pilot. In a second scheme, the channel conditions are estimated based on the quality of the pilot estimates (i.e., the filtered pilot symbols). For each scheme, a particular filter response is selected based on the estimated quality of either the received pilot or the pilot estimates.

42 Claims, 6 Drawing Sheets

U.S. PATENT DOCUMENTS

| | | | |
|---|---|---|---|
| 5,265,119 | A | 11/1993 | Gilhousen et al. |
| 5,343,496 | A * | 8/1994 | Honig et al. ................. 370/342 |
| 5,799,005 | A | 8/1998 | Soliman |
| 5,903,554 | A | 5/1999 | Saints |
| 6,067,324 | A | 5/2000 | Harrison |
| 6,088,324 | A | 7/2000 | Sato |
| 6,097,972 | A | 8/2000 | Saints et al. |
| 6,125,137 | A * | 9/2000 | Wang et al. ................. 375/148 |
| 6,178,194 | B1 | 1/2001 | Vasic |
| 6,356,309 | B1 * | 3/2002 | Masaki et al. ............ 348/439.1 |
| 6,430,214 | B1 | 8/2002 | Jalloul et al. |
| 6,452,917 | B1 * | 9/2002 | Leung ......................... 370/342 |
| 6,463,405 | B1 * | 10/2002 | Case ........................... 704/206 |
| 6,647,003 | B1 * | 11/2003 | Abeta et al. ................. 370/335 |
| 6,671,268 | B2 * | 12/2003 | Leung ......................... 370/342 |
| 6,834,194 | B2 * | 12/2004 | Hunzinger ............... 455/452.2 |
| 6,862,326 | B1 * | 3/2005 | Eran et al. .................. 375/343 |
| 6,947,475 | B2 | 9/2005 | Sendonaris et al. |
| 6,977,978 | B1 * | 12/2005 | Jakobsson ................... 375/350 |
| 2001/0053128 | A1 * | 12/2001 | Lee ............................. 370/244 |
| 2002/0001352 | A1 * | 1/2002 | Stirling-Gallacher et al. .......................... 375/260 |
| 2003/0003889 | A1 * | 1/2003 | Perets ........................ 455/266 |
| 2005/0174929 | A1 * | 8/2005 | Hayashi et al. ............. 370/208 |

FOREIGN PATENT DOCUMENTS

| | | |
|---|---|---|
| JP | 03030531 | 2/1991 |
| JP | 2000038242 | 2/2000 |
| JP | 2001024622 | 1/2001 |
| WO | 0048332 | 8/2000 |
| WO | 01015332 | 3/2001 |

OTHER PUBLICATIONS

Hyuk, Jun. et al., "An Adaptive Channel Estimation Scheme for DS-CDMA Systems" VTC 2000 (1998) IEEE vol. 6, Conf. 52 (2000).*

Hyuk, Jun, et al., "An Adaptive Channel Estimation Scheme for DS-CDMA Systems" VTC 2000 (1998) IEEE vol. 6, Conf. 52 (2000).

Abeta, et al., Adaptive Channel Estimation for Coherent DS-CDMA Mobile Radio Usingtime-Multiplexed Pilot and Parallel Pilot Structures: IEICE Transactions on Communications vol. E.82.B No. 9:1505-1513 (1999).

* cited by examiner

ADAPTIVE PILOT FILTER FOR A WIRELESS COMMUNICATION SYSTEM

CLAIM OF PRIORITY UNDER 35 U.S.C. §120

The present Application for Patent is a Continuation of patent application Ser. No. 09/924,199 entitled "Adaptive Pilot Filter for a Wireless Communication System" filed Aug. 7, 2001, , and issued as U.S. Pat. No. 7,230,975 on Jun. 12, 2007, and assigned to the assignee hereof and hereby expressly incorporated by reference herein.

BACKGROUND

1. Field

The present invention relates generally to data communication, and more specifically to an adaptive pilot filter for use in a wireless communication system.

2. Background

Wireless communication systems are widely deployed to provide various types of communication such as voice, packet data, and so on. These systems may be based on code division multiple access (CDMA), time division multiple access (TDMA), or some other multiple access technique. CDMA systems may provide certain advantages over other types of systems, including increased system capacity. A CDMA system is typically designed to implement one or more standards, such as IS-95, cdma2000, IS-856, and W-CDMA standards, all of which are known in the art.

In a wireless communication system, a pilot is often transmitted from a transmitter unit (e.g., a base station) to a receiver unit (e.g., a terminal) to assist the receiver unit perform a number of functions. The pilot is typically generated based on a known data pattern (e.g., a sequence of all zeros) and using a known signal processing scheme (e.g., covered with a particular channelization code and spread with a known scrambling code or pseudo-noise (PN) sequence). The pilot may be used at the receiver unit for synchronization with the timing and frequency of the transmitter unit, estimation of the quality of the communication channel, coherent demodulation of a data transmission, and possibly other functions such as determination of the specific transmitter unit having the best link to the receiver unit and the highest data rate supportable by this transmitter unit.

At the receiver unit, a rake receiver is often used to recover the transmitted pilot, signaling, and traffic data. A transmitted signal may be received via multiple signal paths (or multipaths), and each received multipath of sufficient strength may be assigned to and processed by a respective finger processor of the rake receiver. Each finger processor processes the assigned multipath in a manner complementary to that performed at the transmitter unit to recover the data and pilot received via this multipath. The recovered pilot has an amplitude and phase determined by, and indicative of, the channel response for this multipath. The pilot is typically used for coherent demodulation of various traffics transmitted along with the pilot, which are similarly distorted by the channel response. The pilots for a number of multipaths are also used to combine demodulated symbols derived from these multipaths to obtain combined symbols having improved quality.

The quality of the recovered pilot directly impacts the performance of the demodulation process, which may in turn impact the performance of the communication system. A transmitted pilot is typically degraded by channel noise and further distorted by fading in the communication channel. These various phenomena (or channel conditions) combine to make it challenging to estimate the time-varying response (i.e., amplitude and phase) of the communication channel at the receiver unit based on the received pilot.

There is therefore a need in the art for techniques to provide an improved estimate of the time-varying response of a communication channel from a received pilot in a wireless communication system.

SUMMARY

Aspects of the invention provide techniques to process a signal received under certain channel conditions to provide pilot symbols, and to filter the pilot symbols in an "adaptive" manner to provide an improved estimate of the response of the communication channel via which the signal was received. It is recognized by the invention that a signal received at a receiver unit (e.g., a terminal) may experience different channel conditions at different times, and different instances of a transmitted signal (i.e., multipaths) may experience different channel conditions even when received close in time. Thus, in an aspect, a pilot filter with an adaptive response is used to provide an improved estimate of the channel response based on the received pilot, which may have experienced various different channel conditions.

A transmitted pilot is degraded by noise in the communication channel and further distorted by fading due to movement by the terminal. A filter with a narrow bandwidth is effective at removing more of the channel noise, but is less effective at tracking variations in the received pilot due to fading. Conversely, a filter with a wide bandwidth is more effective at tracking signal variations due to fading, but also allows a higher amount of channel noise to propagate through the filter.

A pilot filter that provides "optimal" performance has a response that can be adapted based on the channel conditions. The channel conditions may be quantified by various characteristics such as the signal-to-total-noise-plus-interference ratio (SNR) of the received pilot, the speed of the terminal, and possibly others. The bandwidth of the pilot filter may thus be adapted as a function of the pilot SNR, the terminal speed, and so on.

Various adaptive pilot-filtering schemes may be implemented. In a first scheme, the channel conditions are estimated based on the quality of the received pilot, which may be estimated based on the pilot power and noise power. A particular response is then selected for the pilot filter based on the estimated pilot quality (e.g., based on the pilot to noise power ratio). In a second scheme, the channel conditions are estimated based on the quality of the pilot estimates (i.e., the filtered pilot symbols), and this quality may be estimated based on "prediction" errors for the pilot symbols, as described below. A particular response is then selected for the pilot filter (or a filter with a particular response is selected) based on the quality of the pilot estimates (e.g., to minimize the prediction errors). These schemes are described in further detail below. Other schemes may also be implemented and are within the scope of the invention.

The invention further provides methods, pilot filters, rake receivers, apparatus, and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
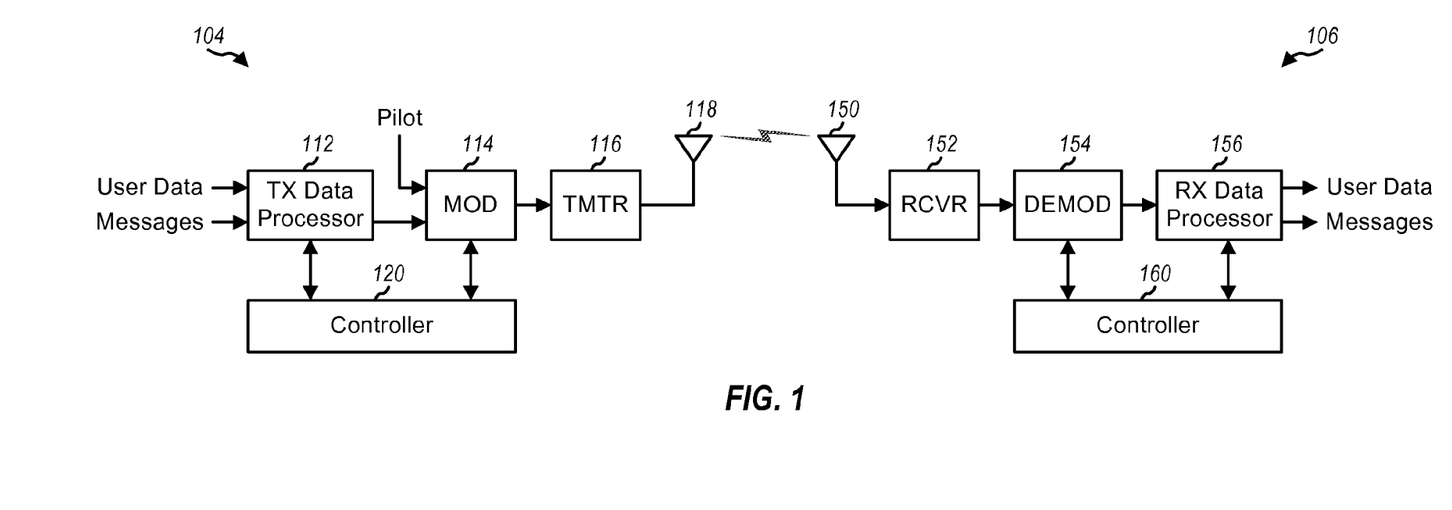
FIG. 1 is a simplified block diagram of a base station and a terminal in a wireless communication system.

FIG. 1 is a simplified block diagram of a base station 104 and a terminal 106 in a wireless communication system, which are capable of implementing various aspects and embodiments of the invention. On the forward link (i.e., downlink), at base station 104, a transmit (TX) data processor 112 receives various types of "traffic" such as user-specific data, messages, and so on. TX data processor 112 then formats and codes the different types of traffic based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 114 then receives pilot data and the coded data from TX data processor 112, and further processes the received data to generate modulated data. For some CDMA systems, the processing by modulator 114 includes (1) covering the coded and pilot data with different channelization codes to channelize the user-specific data, messages, and pilot data onto their respective traffic channels and (2) spreading the channelized data with a scrambling code. The channelization codes are Walsh codes in IS-95 and cdma2000 and orthogonal variable spreading factor (OVSF) codes in W-CDMA. The scrambling code is a complex pseudo-noise (PN) sequence at a particular offset in IS-95 and cdma2000 and a particular scrambling sequence in W-CDMA. "Covering" with a Walsh code in IS-95 and cdma2000 is equivalent to "spreading" with an OVSF code in W-CDMA, and "spreading" with the PN sequence in IS-95 and cdma2000 is equivalent to "scrambling" with a scrambling sequence in W-CDMA. The modulated data is then provided to a transmitter (TMTR) 116 and conditioned (e.g., converted to one or more analog signals, amplified, filtered, and quadrature modulated) to generate a forward modulated signal suitable for transmission via an antenna 118 and over a wireless communication channel to the terminals.

At terminal 106, the forward modulated signal is received by an antenna 150 and provided to a receiver (RCVR) 152. Receiver 152 conditions (e.g., filters, amplifies, downconverts, and digitizes) the received signal and provides data samples. A demodulator (DEMOD) 154 then receives and processes the data samples to provide recovered symbols. For some CDMA systems, the processing by demodulator 154 includes (1) despreading the data samples with the same scrambling code used to spread the data at the base station, (2) decovering the despread samples to channelize the received data and messages onto their respective traffic channels, and (3) coherently demodulating the channelized data with a pilot recovered from the received signal. Demodulator 154 may implement a rake receiver that can process multiple signal instances in the received signal, as described below.

A receive (RX) data processor 156 then receives and decodes the symbols from demodulator 154 to recover the user-specific data and messages transmitted on the forward link. The processing by demodulator 154 and RX data processor 156 is complementary to that performed by modulator 114 and TX data processor 112, respectively, at base station 104.

As noted above, for some wireless communication systems, a pilot is transmitted along with other types of traffic on the forward link from the base station to the terminals. In some systems, a pilot is also transmitted on the reverse link from each active terminal to the base station. The transmitted pilot is used by the receiver unit to coherently demodulate the various traffics transmitted along with the pilot.

To generate the pilot at the base station, the pilot data is initially covered with a particular channelization code used to transmit the pilot, and further spread with the scrambling code. To simplify the signal processing at both the base station and the terminal, CDMA systems typically use a sequence of all zeros for the pilot data and a channelization code of zero for the pilot channel. In this case, the pilot is effectively the scrambling code assigned to the base station.

W-CDMA supports a number of different pilot channels. First, a common pilot channel (CPICH) may be generated as described above and transmitted on a primary base station antenna. In addition, a diversity CPICH may be generated as described above, except that the pilot data is non-zero, and transmitted on a diversity antenna of the base station. Furthermore, one or more secondary CPICHs may be transmitted in a restricted part of the cell, and each secondary CPICH is generated using a non-zero channelization code. The base station may further transmit a dedicated pilot to a specific user using the same channelization code as the user's data channel. In this case, the pilot symbols are time-multiplexed with the data symbols to that user. Finally, on the uplink, the terminal transmits a quadrature-multiplexed pilot signal along with its uplink data to the base station. It will be well-understood by those skilled in the art that the techniques described herein are applicable for processing all of the above different types of pilot channels, and other pilot channels that may also be transmitted in a wireless communication system.

At the terminal, the pilot from the base station may be recovered by processing a received signal in a manner complementary to that performed at the base station. The processing at the terminal typically includes (1) conditioning and digitizing the received signal to provide data samples, (2) despreading the data samples with the scrambling code at a specific chip offset (or phase) matching that of the multipath being processed, (3) decovering the despread samples with the same channelization code used to cover the pilot data at the base station, and (4) multiplying the decovered samples with the known pilot data and accumulating the resulting samples over an appropriate period of time. If the pilot data is a sequence of all zero and the channelization code is zero, then the processing to recover the pilot simply includes despreading the data samples with the scrambling code and accumulating the despread samples over an integer multiple of the length of the channelization code (to remove the data transmitted on other traffic channels). This complementary signal processing recovers the (desired) pilot transmitted from the base station and removes other (extraneous) transmissions on other traffic channels from this and other base stations.

Figure 2:
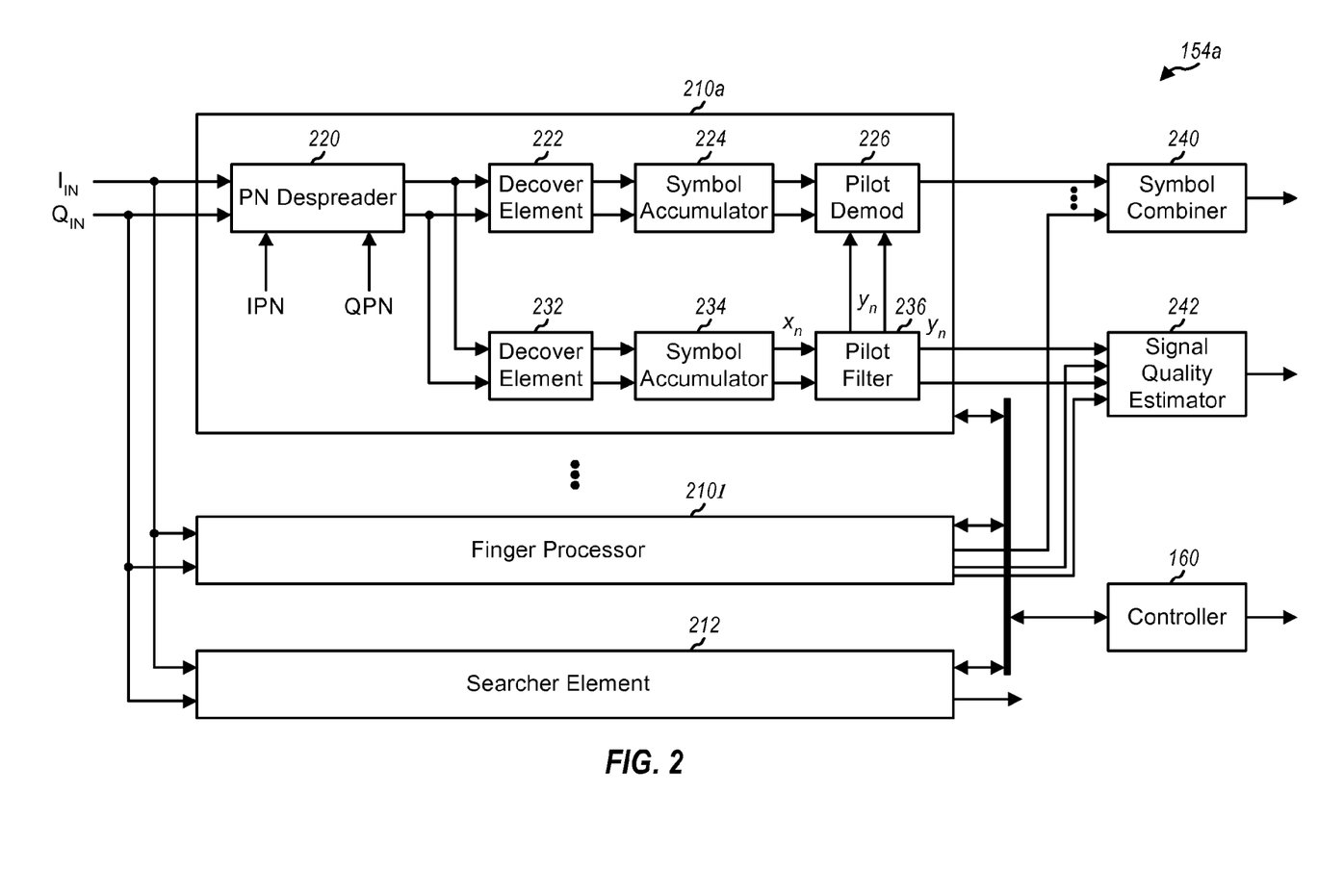
FIG. 2 is a block diagram of an embodiment of a rake receiver that incorporates an adaptive pilot filter of the invention.

FIG. 2 is a block diagram of an embodiment of a demodulator 154*a* that may be used to search for strong signal instances (or multipaths) in a received signal and to demodulate one or more multipaths of sufficient strength. Demodulator 154a is one embodiment of demodulator 154 in FIG. 1, and implements a rake receiver that includes a number of finger processors 210 (or demodulation fingers) and a searcher element 212 (or searcher).

Due to multipath and other phenomena, a signal transmitted from a base station may be received by a terminal via multiple signal paths. The received signal at the terminal may thus include a number of multipaths for one or more base stations. Searcher 212 is then used to search for strong multipaths in the received signal and to provide an indication of the strength and timing of each found multipath that meets a set of criteria.

The rake receiver is designed with the capability to process multiple (and typically strongest) signal instances found by searcher 212. One finger processor 210 may be assigned to process each multipath of interest (e.g., each multipath of sufficient strength, as determined by controller 160 based on the signal strength information provided by searcher 212).

As shown in FIG. 2, the complex samples, $I_{IN}$ and $Q_{IN}$, from receiver 152 are provided to a number of finger processors 210a through 210l. Within each finger processor 210 assigned to process a particular multipath, the $I_{IN}$ and $Q_{IN}$ samples are provided to a PN despreader 220, which also receives the scrambling code used to spread the data at the base station. The scrambling code is generated in accordance with the particular CDMA standard being implemented and with a particular chip offset (i.e., a particular phase) aligned to that of the multipath being processed by that finger processor.

PN despreader 220 performs a complex multiply of the complex $I_{IN}$ and $Q_{IN}$ samples with the scrambling code and provides complex despread $I_{DES}$ and $Q_{DES}$ samples to decover elements 222 and 232. Decover element 222 decovers the despread samples with one or more channelization codes (e.g., Walsh codes or OVSF codes) used to cover the data, and generates complex decovered data samples. The decovered data samples are then provided to a symbol accumulator 224, which accumulates the samples over the length of the channelization code to generate decovered data symbols. Decover element 222 and symbol accumulator 224 effectively form a first "channelizer" that recovers the data transmitted on a particular traffic channel. The decovered data symbols are then provided to a pilot demodulator 226.

For many CDMA systems, on the forward link, a pilot is transmitted continuously at all times or non-continuously during portions of a transmission. To recover the transmitted pilot, decover element 232 decovers the despread samples with the particular channelization code used to cover the pilot at the base station. The channelization code is Walsh code of zero for IS-95 and cdma2000, and an OVSF code of zero for some pilot channels in W-CDMA. The decovered pilot samples are then provided to an accumulator 234, which accumulates sets of samples to provide pilot symbols, $x_n$. Each set includes a number of samples for $N_C$ chips, which represents a pilot accumulation time interval. This time interval may be an integer multiple of the length of the channelization code used for the pilot, an entire pilot reference period (if the pilot is transmitted in bursts), or some other time interval. Symbol accumulator 234 then provides the pilot symbols to a pilot filter 236. Decover element 232 and symbol accumulator 234 effectively form a second channelizer that recovers the pilot transmitted on a particular pilot channel.

Pilot filter 236 may be implemented with various filter designs, as described below. Pilot filter 236 filters (and may further interpolates) the received pilot symbols, $x_n$, to provide pilot estimates, $y_n$, which are estimates of the response of the communication channel via which the multipath was received. Pilot filter 236 may further receive and utilize the decovered data symbols (from symbol accumulator 224) to provide improved pilot estimates, as described in U.S. Pat. No. 6,947,475, entitled "METHOD AND APPARATUS FOR ESTIMATING CHANNEL CHARACTERISTICS USING PILOT AND NON-PILOT DATA", issued Sep. 20, 2005, assigned to the assignee of the present application and incorporated herein by reference. Pilot filter 236 typically provides one pilot estimate for each decovered data symbol to be coherently demodulated. The pilot estimates are provided to pilot demodulator 226 and used to coherently demodulate the decovered data symbols, and are also provided to a signal quality estimator 242 that detects the strength of the recovered pilot.

Pilot demodulator 226 performs coherent demodulation of the decovered data symbols from symbol accumulator 224 with the pilot estimates from pilot filter 236 and provides demodulated symbols to a symbol combiner 240. Coherent demodulation can be achieved by performing a dot product and a cross product of the decovered data symbols with the pilot estimates. The dot and cross products effectively perform a phase demodulation of the data and further scale the resultant output by the relative strength of the recovered pilot. The scaling with the pilots by the finger processors effectively weighs the contributions from different multipaths in accordance with the quality of the multipaths for efficient combining. The dot and cross products thus perform the dual role of phase projection and signal weighting that are characteristics of a coherent rake receiver.

Symbol combiner 240 receives and coherently combines the demodulated symbols from all assigned finger processors 210 to provide recovered symbols for a particular data transmission being processed by the rake receiver. The recovered symbols are then provided to the subsequent processing element (i.e., RX data processor 156).

Signal quality estimator 242 may computes the energy of the pilot by (1) squaring the inphase and quadrature components of the pilot estimates, $P_I^2$ and $P_Q^2$, where $y_n = P_I + jP_Q$ (2) summing each pair of squared results to generate a sum of squares, $P_I^2 + P_Q^2$, and (3) accumulating $N_M$ sums of squares to generate a correlated value that is indicative of the strength of the recovered pilot.

Conventionally, a single pilot filter with a specific response is used to filter the pilot symbols to provide the pilot estimates. This pilot filter has a particular bandwidth selected to be robust across all channel conditions (i.e., the bandwidth is typically selected to provide acceptable performance based on certain assumptions for the channel conditions). However, since the channel conditions can vary over time for a given terminal and typically vary from terminal to terminal, the use of a single pilot filter by all terminals at all times provides sub-optimal performance in many situations.

Aspects of the invention provide techniques to filter the pilot symbols in an "adaptive" manner to provide improved estimates of the response of the communication channel based on a pilot that may have been received under various channel conditions. It is recognized by the invention that a signal received at a given terminal may experience different channel conditions at different times, and different multipaths may experience different channel conditions even when received close in time. Thus, in an aspect, a pilot filter with an adaptive response is used to provide an improved estimate of the channel response based on the pilot, which may have been received under various different channel conditions.

As noted above, a transmitted pilot is degraded by noise in the communication channel and further distorted by fading due to movement by the terminal. A filter with a narrow bandwidth (i.e., one with a long time constant) is effective at removing more of the channel noise, but is less effective at tracking variations in the received pilot due to fading. Conversely, a filter with a wide bandwidth (i.e., one with a short time constant) is more effective at tracking signal variations due to fading, but also allows a higher amount of channel noise to propagate through the filter.

Table 1 lists the filter responses that are likely to provide improved performance for various channel conditions. The two data rows in Table 1 correspond to different amounts of channel noise (i.e., low and high channel noise), and the two data columns correspond to different terminal speed (i.e., low and high speed). When the channel noise is low, a wide bandwidth filter is typically preferred since it is better able to track signal variations while allowing a moderate amount of channel noise to propagate through. When the channel noise is high and at low speed, the signal variations are typically small and a narrow bandwidth filter is preferred since it is better able to filter more of the channel noise while still able to track the slow signal variations. And when the channel noise and the terminal speed are both high, the filter response that can provide better performance is dependent on the amount of channel noise versus the amount of signal variations.

TABLE 1

|  | Low Speed | High Speed |
|---|---|---|
| Low Channel Noise | Wide Bandwidth | Wide Bandwidth |
| High Channel Noise | Narrow Bandwidth | — |

The symbols corresponding to a received pilot may be expressed as:

$$x_n = p_n + n_n, \quad \text{Eq (1)}$$

where
- $x_n$ represents the pilot symbols, as received at the terminal,
- $p_n$ represents the pilot symbols received at the terminal after experiencing fading due the channel but without any added noise, and
- $n_n$ represents the total noise, which includes the channel noise, receiver noise, and interference from other base stations and multipaths.

The quantities $x_n$, $p_n$, and $n_n$ are complex values. Since the transmitted pilot has a known (constant) amplitude and phase, $x_n$ effectively represents the response of the communication channel.

Estimates of the pilot, as received at the terminal, may be obtained by filtering or averaging the pilot symbols. If a finite impulse response (FIR) filter structure is used for the pilot filter, then the filtered pilot symbols (i.e., the pilot estimates) may be expressed as:

$$y_n = \sum_i w_i x_{n-i}, \quad \text{Eq (2)}$$

where $y_n$ represents the pilot estimates and $w_i$ represents the filter coefficients. Conventionally, the filter coefficients (and thus the filter response) are selected to provide robust performance across all channel conditions.

A pilot filter that provides "optimal" performance has a response that can be adapted based on the channel conditions. The channel conditions may be quantified by various characteristics such as a signal-to-total-noise-plus-interference ratio (SNR) of the received pilot, the speed of the terminal, and possibly others. The response (e.g., bandwidth) of the pilot filter may thus be adapted as a function of the pilot SNR, the terminal speed, and so on. Various adaptive pilot filtering schemes may be implemented, some of which are described below.

In a first adaptive pilot filtering scheme, the channel conditions are estimated based on the quality of the received pilot, which may be estimated based on the pilot power and noise power. A particular response is then selected for the pilot filter based on the estimated pilot quality (e.g., based on the pilot to noise power ratio). For this scheme, the pilot power may be estimated based on the received pilot symbols, as follows:

$$S_n = \sum_i |x_{n-i}|^2 g_i, \quad \text{Eq (3a)}$$

or may be estimated based on the filtered pilot symbols, as follows:

$$S_n = \sum_i |y_{n-i}|^2 g_i, \quad \text{Eq (3b)}$$

where $g_i$ represents the signal averaging coefficients. Short-term averages may be used for equations (3a) and (3b) by setting $g_i$ to 1.0. Filtered averages may also be used for equations (3a) and (3b) by setting $g_i$ to some other values. The proper values for $g_i$ may be determined by computer simulation, empirical measurements, and so on. The noise power may also be estimated based on the received pilot symbols, as follows:

$$N_n = \sum_i |x_{n-i} - x_{n-i-1}|^2 g_i. \quad \text{Eq (4)}$$

The noise averaging coefficients in equation (4) do not need to be the same as the signal averaging coefficients in equations (3a) and (3b). The duration of the averaging is selected to be both (1) long enough so that reliable estimates for $S_n$ and $N_n$ may be formed and (2) short enough so that changes in SNR may be responded to within a reasonable time. The estimated noise power, $N_n$, in equation (4) includes the channel noise as well as the noise component due to terminal speed. In equations (3a), (3b), and (4), one pilot power estimate, $S_n$, and one noise power estimate, $N_n$, are provided for each received pilot symbol, $x_n$.

The averaging interval for the summations in equations (3a), (3b), and (4) used to estimate the pilot and noise power may be selected based on various considerations. A shorter averaging interval (i.e., a wider bandwidth) provides better tracking of fades but also allows in more noise. The pilot filter response should be fast enough to track the actual changes in the channel, but the averaging interval for equations (3a), (3b), and (4) needs to be fast enough only to track relatively long-term changes such as a user changing from low-speed to high-speed.

Other methods to estimate the pilot power and noise power may also be used and are within the scope of the invention.

Some methods to estimate pilot and noise power estimation are described in U.S. Pat. Nos. 6,097,972, 5,903,554, 5,799, 005, 5,265,119, and 5,056,109, which are all incorporated herein by reference.

A pilot-to-noise power ratio, $SNR_n$, is then computed based on the pilot and noise power estimates (i.e., $SNR_n = S_n/N_n$), and the response of the pilot filter can be selected based on the computed $SNR_n$. In general, a pilot filter with a wider bandwidth may be used if the $SNR_n$ is high, and a pilot filter with a narrow bandwidth should be used if the $SNR_n$ is low. The bandwidth selection may be achieved by comparing the $SNR_n$ against a set of one or more thresholds, $T_k$.

In an embodiment, $(N_T-1)$ thresholds are used to select one of $N_T$ different possible responses for the pilot filter. The $(N_T-1)$ thresholds may be arranged in an ordered list $(T_1 < \ldots < T_k < \ldots < T_{N_T-1})$ and are associated with $N_T$ filter responses having bandwidths that are also arranged in an ordered list $(B_1 < \ldots < B_k < \ldots < B_{N_T})$. The narrowest filter bandwidth, $B_1$, would be selected if the $SNR_n$ is less than or equal to the lowest threshold, $T_1$ (i.e., $SNR_n \leq T_1$); the second narrowest filter bandwidth, $B_2$, would be selected if the $SNR_n$ is greater than $T_1$ but less than or equal to the second lowest threshold, $T_2$ (i.e., $T_1 < SNR_n \leq T_2$); and so on; and the widest filter bandwidth, $B_{N_T}$, would be selected if the $SNR_n$ is greater than the highest threshold, $T_{N_T-1}$ (i.e., $T_{N_T-1} < SNR_n$). The selection of the bandwidth based on the comparison of the $SNR_n$ against the thresholds can be summarized as:

$$\text{Bandwidth} = \begin{cases} B_1 & \text{if } SNR_n \leq T_1, \\ B_2 & \text{if } T_1 < SNR_n \leq T_2, \\ \vdots \\ B_{N_T} & \text{if } T_{N-1} < SNR_n. \end{cases} \quad \text{Eq (5)}$$

For the first scheme, a single filter with an adaptable response may be used to implement different bandwidths, as determined by the $SNR_n$. For example, if the pilot filter is implemented with a FIR filter structure or an infinite impulse response (IIR) filter structure, then one set of filter coefficients may be used for each possible filter response, and a specific set of filter coefficients is selected for used based on the $SNR_n$ and the thresholds.

Figure 3:
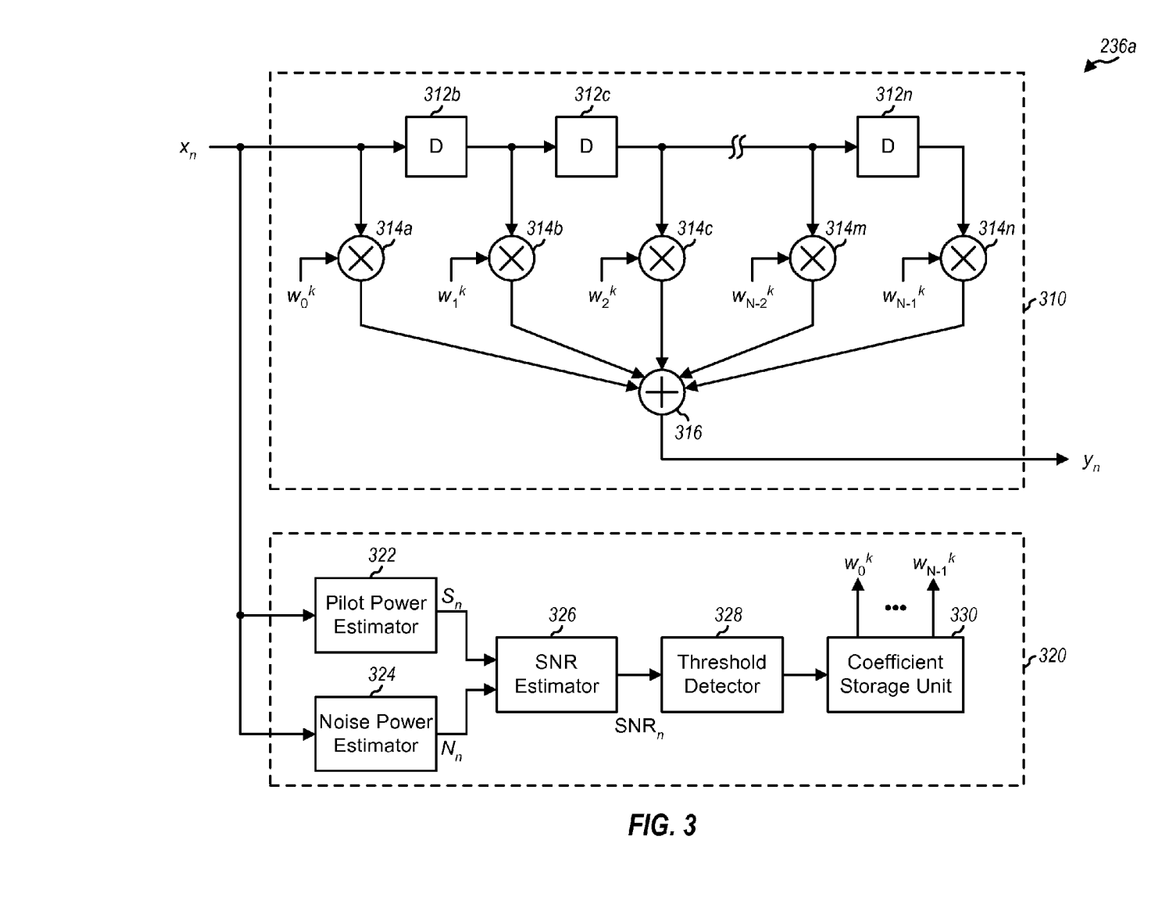
FIG. 3 is a diagram of an embodiment of a pilot filter capable of implementing a first adaptive pilot filtering scheme.

FIG. 3 is a diagram of an embodiment of a pilot filter 236a, which is capable of implementing the first adaptive pilot filtering scheme. Pilot filter 236a may be used to implement pilot filter 236 in FIG. 2, and includes a FIR filter 310 coupled to a control unit 320. FIR filter 310 receives and filters the pilot symbols, $x_n$, in accordance with a particular filter response and provides the filtered pilot symbols, $y_n$. The particular response of FIR filter 310 (and thus the bandwidth) is determined by a set of coefficients, $w_0^k$ through $w_{N-1}^k$, provided by control unit 320.

Within FIR filter 310, the received pilot symbols, $x_n$, are provided to a set of series-coupled delay elements 312b through 312n. The received pilot symbols, $x_n$, and the outputs of delay elements 312b through 312n are respectively provided to multipliers 314a through 314n, which also respectively receive coefficients $w_0^k$ through $w_{N-1}^k$. Each multiplier 314 multiplies each received symbol with the received coefficient and provides a scaled symbol to a summer 316. Summer 316 adds the scaled symbols from all multipliers 314 to provide the filtered pilot symbol, $y_n$. The filtered pilot symbol from FIR filter 310 may be expressed as:

$$y_n = \sum_{i=0}^{N-1} w_i^k \cdot x_{n-i}. \quad \text{Eq (6)}$$

Within control unit 320, the received pilot symbols, $x_n$, are provided to a pilot power estimator 322 and a noise power estimator 324, which respectively estimate the pilot and noise power as described above. Although not shown in FIG. 3, the pilot power may also be estimated based on the filter pilot symbols, $y_n$. The pilot power estimate, $S_n$, and the noise power estimate, $N_n$, are then provided to an SNR estimator 326 that computes the ratio of the pilot to noise power. The pilot-to-noise power ratio, $SNR_n$, is then provided to a threshold detector 328, which compares the $SNR_n$ to one or more thresholds, $T_k$. Based on the results of the comparison, a specific filter response (e.g., a particular bandwidth) is selected from among a number of possible filter responses and indicated by a Select signal from threshold detector 328. A coefficient storage unit 330 receives the Select signal and provides to FIR filter 310 the set of filter coefficients for the selected filter response.

For clarity, FIG. 3 shows a pilot filter using the FIR filter structure. The pilot filter may also be implemented using an IIR filter structure or some other filter structure. Control unit 320 may be implemented as a separate unit or may be implemented within controller 160.

In a second adaptive pilot filtering scheme, the channel conditions are estimated based on the quality of the pilot estimates, which may be estimated based on "prediction" errors for the pilot. A particular response is then selected for the pilot filter (or a filter with a particular response is selected) based on the quality of the pilot estimates (e.g., to minimize the prediction errors). In one embodiment of this scheme, the pilot symbols are initially filtered using a bank of two or more filters having different responses (or bandwidths). Prediction errors are then computed for each filter, and the filter that minimizes the prediction errors is selected for use.

If a FIR filter structure is used for each filter in the bank, then the filtered pilot symbols (or pilot estimates) may be expressed as:

$$y_n^1 = \sum_i w_i^1 \cdot x_{n-i} = w_0^1 x_n + \sum_{i \neq 0} w_i^1 \cdot x_{n-i},$$
$$y_n^2 = \sum_i w_i^2 \cdot x_{n-i} = w_0^2 x_n + \sum_{i \neq 0} w_i^2 \cdot x_{n-i},$$
$$\vdots$$
$$y_n^k = \sum_i w_i^k \cdot x_{n-i} = w_0^k x_n + \sum_{i \neq 0} w_i^k \cdot x_{n-i}, \quad \text{Eq (7)}$$

where $y_n^k$ is the pilot estimate from the k-th filter for the received pilot symbol $x_n$, and $w_i^k$ represents the coefficients for the k-th filter. Each equation in equation set (7) defines a respective filter in the bank. For each equation, the estimate of the current received pilot symbol, $y_n^k$, is composed of (1) a predictive term $$\left( \text{i.e.,} \sum_{i \neq 0} w_i^k \cdot x_{n-i} \right)$$

that is dependent on received pilot symbols other than the current one, and (2) a second term (i.e., $w_0^k x_n$) that is dependent on the current received pilot symbol.

If a (one-pole) IIR filter structure is used for each filter in the bank, then the filtered pilot symbols (or pilot estimates) may be expressed as:

$$y_n^1 = (1-\alpha_1) \cdot y_{n-1}^1 + \alpha_1 \cdot x_n,$$

$$y_n^2 = (1-\alpha_2) \cdot y_{n-1}^2 + \alpha_2 \cdot x_n, \quad \text{Eq (8)}$$

...

$$y_n^k = (1-\alpha_k) \cdot y_{n-1}^k + \alpha_k \cdot x_n,$$

where $a_k$ is the time constant for the k-th filter. For each equation in equation set (8), the estimate of the current pilot symbol, $y_n^k$, is composed of a predictive term (i.e., $(1-\alpha_k) \cdot y_{n-1}^k$) that is dependent on prior received pilot symbols and a second term (i.e., $\alpha_k \cdot x_n$) that is dependent on the current received pilot symbol.

The time constant, $\alpha_k$, is proportional to the bandwidth of the filter, and a different time constant is used for each filter in the bank. A larger time constant, $\alpha_k$, weighs the current received pilot symbol more and the previous received pilot symbols less, and results in less filtering of the received pilot symbols (i.e., wider bandwidth).

For either filter structure (IIR or FIR), the responses (and thus the bandwidths) for the filters may be selected to be geometrically related (e.g., power of twos of each other) or may be defined based on some other relationship. For example, the time constants, $\alpha_k$, for the IIR filter may be selected as ½, ¼, ⅛, and so on.

Other types of predictors may also be used and are within the scope of the invention.

For either filter structure (IIR or FIR), a prediction error, $e_n^k$, may be computed for each filter in the bank, as follows:

$$e_n^k = y_{n-1}^k - x_n. \quad \text{Eq (9)}$$

As shown in equation (9), the quantity $y_{n-1}^k$ is an estimate of an immediately prior received pilot symbol, $x_{n-1}$, and may also be used as the prediction for the current received pilot symbol, $x_n$. The prediction error, $e_n^k$, is thus computed between the prediction, $y_{n-1}^k$, and the actual received pilot symbol, $x_n$.

For the general IIR or FIR case, the prediction error may be determined as follows. First, the filtered pilot symbols may be expressed as follows:

$$y_n = w_0 \cdot x_n + (1-w_0) \cdot \hat{x}_n, \quad \text{Eq (10)}$$

where $\hat{x}_n$ is the prediction for the received pilot symbols, $x_n$. The prediction error, $e_n$, can then be expressed as:

$$e_n = x_n - \hat{x}_n. \quad \text{Eq (11)}$$

If the filtered pilot symbols is expressed as:

$$y_n = w_0 \cdot x_n + \sum_{i \neq 0} w_i \cdot x_{n-1}, \quad \text{Eq (12)}$$

then the prediction, $\hat{x}_n$, may be expressed as:

$$\hat{x}_n = \frac{1}{1-w_0} \sum_{i \neq 0} w_i \cdot x_{n-i}, \quad \text{Eq (13)}$$

and the prediction error, $e_n$, may be expressed as:

$$e_n = x_n - \frac{1}{1-w_0} \sum_{i \neq 0} w_i \cdot x_{n-i}. \quad \text{Eq (14)}$$

A long-term average of the prediction error, $E_n^k$ (i.e., the prediction error estimate) may be computed, e.g., as follows:

$$E_n^k = \sum_i |e_{n-i}^k|^2 \cdot b_i, \quad \text{Eq (15)}$$

where $b_i$ represents the coefficients used for the prediction error averaging. The coefficients, $b_i$, may be selected to provide uniform averaging (i.e., all ones for the coefficients $b_i$), to weigh recent prediction errors more heavily, or to achieve some other characteristics.

The prediction error estimates, $E_n^k$, for all filters are compared against each other, and the specific filter that has the smallest prediction error (i.e., that minimizes the prediction error) is selected for use. The prediction error comparison and filter selection may be performed (1) periodically at regular time intervals (which may be selected as several time constants), at the start of each slot (e.g., 1.67 msec for some CDMA systems and 0.66 msec in W-CDMA), at the start of each frame (e.g., 20 msec), or some other time, and/or (2) whenever desired.

Figure 4A:
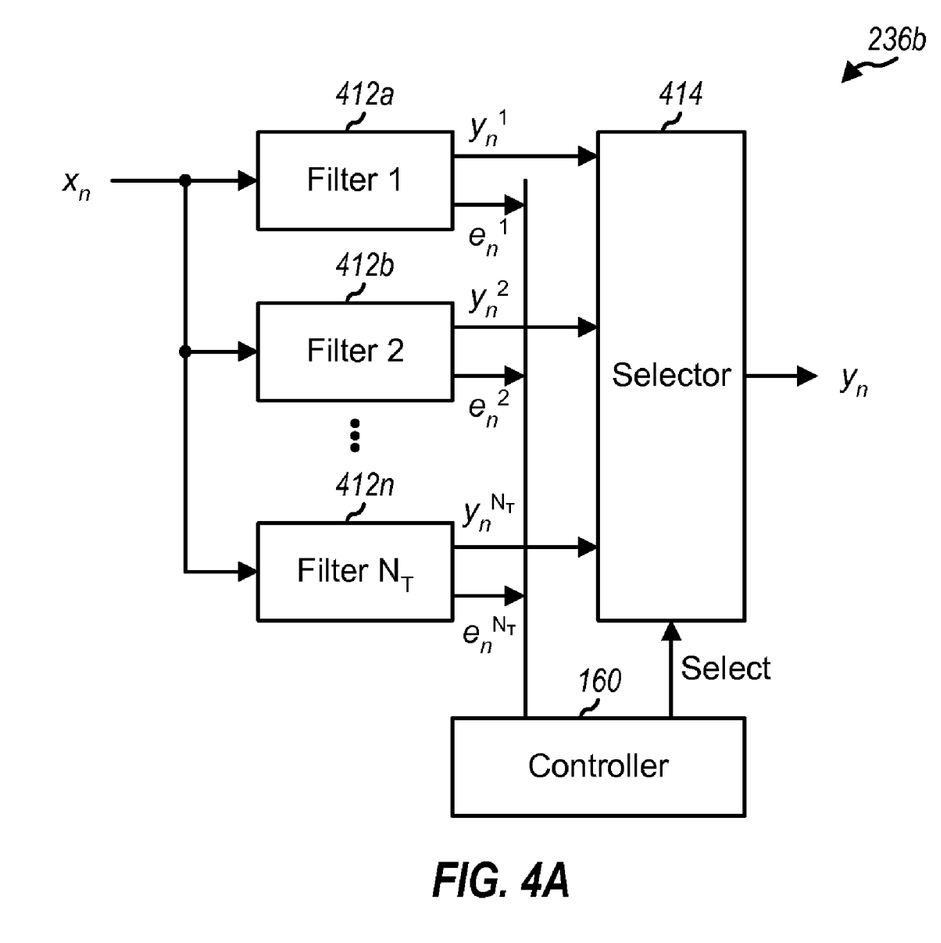
FIGS. 4A and 4B are diagrams of an embodiment of a pilot filter capable of implementing a second adaptive pilot filtering scheme.

FIG. 4A is a diagram of an embodiment of a pilot filter 236b, which is capable of implementing the second adaptive pilot filtering scheme. Pilot filter 236b may also be used to implement pilot filter 236 in FIG. 2, and includes a bank of filters 412a through 412n coupled to a selector 414.

Each filter 412 may be implemented as a FIR filter, an IIR filter, or some other filter structure, and is further associated with a respective response (e.g., a particular bandwidth). Each filter 412 receives and filters the pilot symbols, $x_n$, based on its filter response and provides filtered pilot symbols, $y_n^k$. In an embodiment, each filter 412 further computes the prediction errors, $e_n^k$, between the received pilot symbols and the filtered pilot symbols, and further derives the prediction error estimates, $E_n^k$, as described above. The filtered pilot symbols from filters 412a through 412n are provided to selector 414, which also receives a Select signal from controller 160. Selector 414 then provides the filtered pilot symbols from the specific filter having the best performance, as indicated by the Select signal from controller 160. The filtered pilot symbols, $y_n$, from the selected filter are then provided to other processing elements, e.g., pilot demodulator 226 in the rake receiver shown in FIG. 2.

Figure 4B:
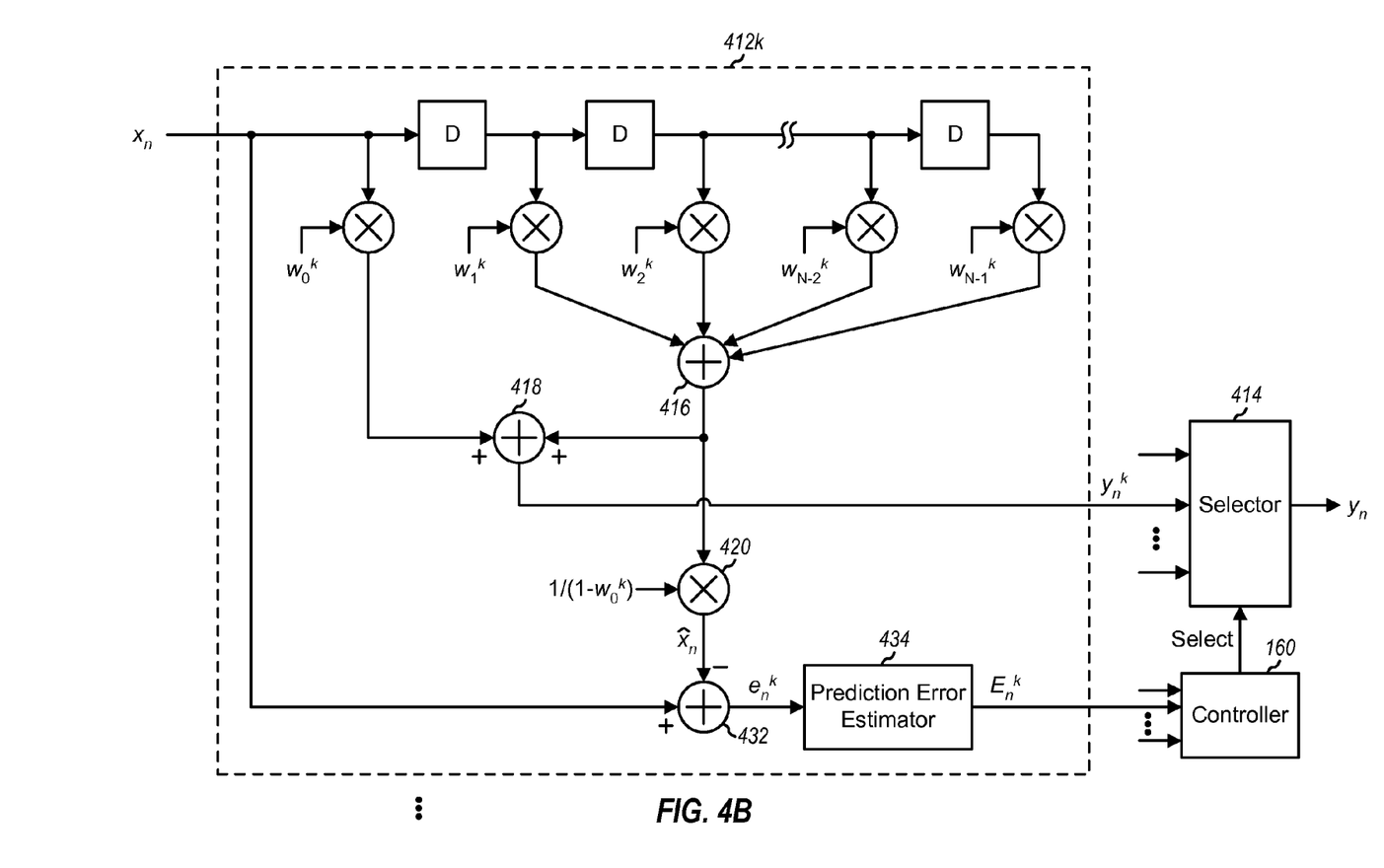

FIG. 4B is a diagram of an embodiment of filter 412k, which is one filter from the bank of filters 412a through 412n shown in FIG. 4A. In this embodiment, filter 412k is implemented as a FIR filter that is assigned a specific set of coefficients, $w_0^k$ through $w_{N-1}^k$, to implement its specific response. Filter 412k is implemented similar to FIR filter 310 shown in FIG. 3 and generates filtered pilot symbols, $y_n^k$, which are provided to selector 414.

As shown in FIG. 4B, a summer 432 derives the prediction errors, $e_n^k$, by subtracting the predicted pilot symbols, $\hat{x}_n$, from the received pilot symbols, $x_n$. The predicted pilot symbols, $\hat{x}_n$, are derived by scaling the output from summer 416 (which includes all terms for the FIR filter except the current pilot symbol, i.e., $$\sum_{i \neq 0} w_i^k \cdot x_{n-i})$$

with the scaling factor $1/(1-w_0^k)$, as shown in equation (13). A prediction error estimator 434 receives the prediction errors, $e_n^k$, derives the prediction error estimates, $E_n^k$, as described above, and provides the prediction error estimates to controller 160. Estimator 434 may implement a filter of any type and order, as is known in the art. Controller 160 receives the prediction error estimates from all filters 412a through 412n, determines the filter having the minimum prediction error, and provides the Select signal that identifies the filter having the best performance. Each filter 412 may alternatively be designed to receive the Select signal and provide the filtered pilot symbols only when directed by the Select signal.

In another embodiment, controller 160 may be designed to derive the prediction error estimates, $E_n^k$, for all filters 412 based on the received pilot symbols, $x_n$, and either the filtered pilot symbol, $y_n^k$, from summer 418 or the term $$\sum_{i \neq 0} w_i^k \cdot x_{n-i}$$

from summer 416.

In one specific design, the responses of all filters 412 are fixed (i.e., each filter is assigned a fixed set of coefficients). For example, the filters may be designed such that the bandwidths or time constants for the filters are (1) geometrically related (e.g., bandwidths of BW, BW/2, BW/4, and so on), (2) based on some other defined relationships, or (3) varied in some other manner. This may simplify the design of the filters.

In another specific design, the filters may be programmable to achieve different responses. For example, different sets of coefficients may be provided for the filters, e.g., based on control signals from controller 160. This programmability feature would allow the filters to be dynamically adjusted to match varied channel conditions.

Figure 5:
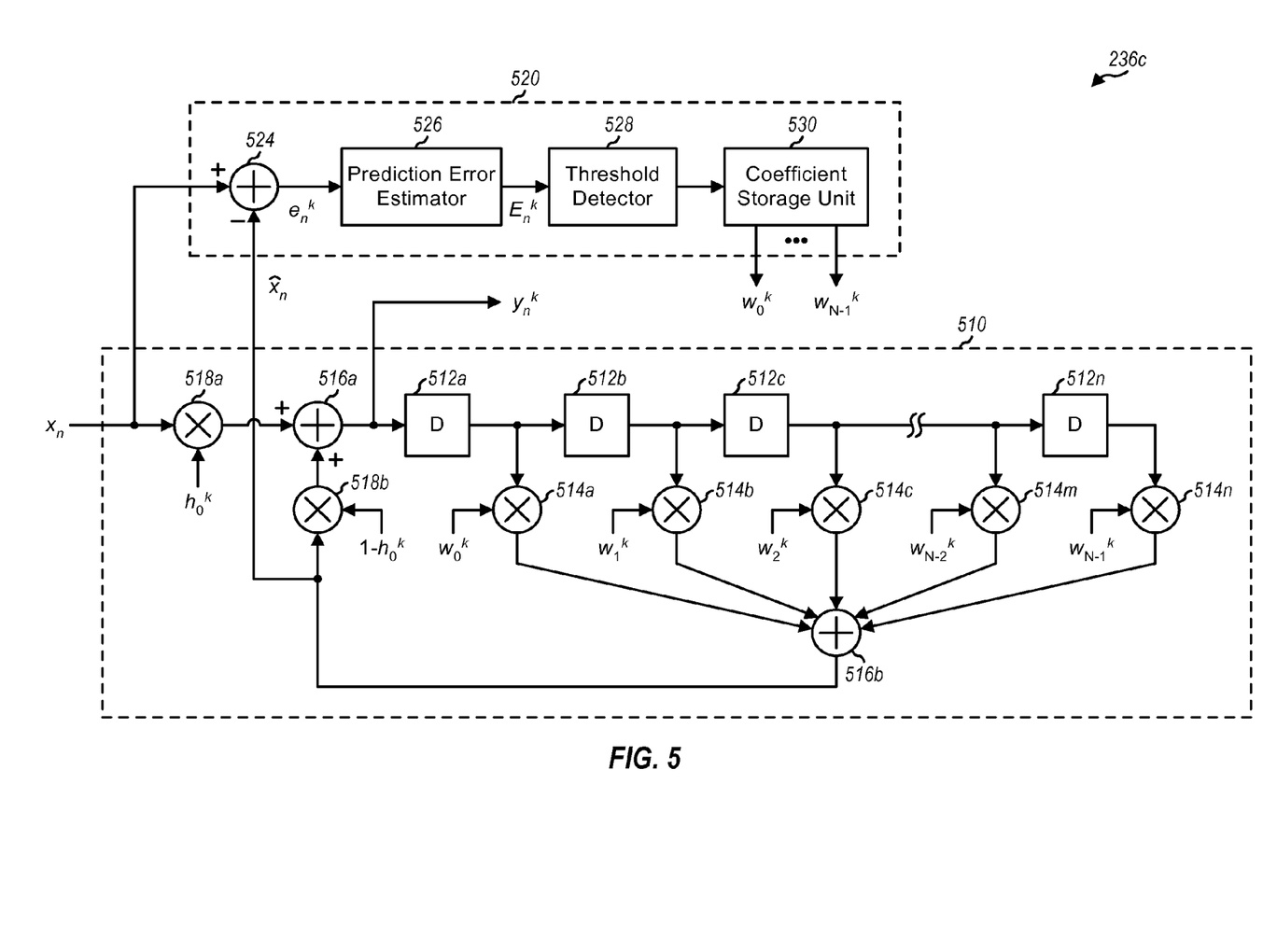
FIG. 5 is a diagram of another embodiment of a pilot filter capable of implementing the second adaptive pilot-filtering scheme.

FIG. 5 is a diagram of an embodiment of a pilot filter 236c, which is also capable of implementing the second adaptive pilot filtering scheme. Pilot filter 236c may also be used to implement pilot filter 236 in FIG. 2, and includes an IIR filter 510 coupled to a control unit 520. IIR filter 510 receives and filters the pilot symbols, $x_n$, in accordance with a particular filter response and provides the filtered pilot symbols, $y_n$. IIR filter 510 has a response that is determined by a set of coefficients, $w_0^k$ through $w_{N-1}^k$, provided by control unit 520.

Within IIR filter 510, the received pilot symbols, $x_n$, are scaled by a multiplier 518a and further provided to a summer 516a. Summer 516a receives and adds the outputs from multipliers 518a and 518b to provide the filtered pilot symbols, $y_n^k$, which are generated based on the k-th set of coefficients. The filtered pilot symbols, $y_n^k$, are further provided to a number of series-coupled delay elements 512a through 512n. The outputs from delay elements 512a through 512n are respectively provided to multipliers 514a through 514n, which also respectively receive the coefficients, $w_0^k$ through $w_{N-1}^k$, for the k-th set. Each multiplier 514 multiplies each received symbol with the received coefficient and provides a scaled symbol to summer 516b. Summer 516b adds the scaled symbols from all multipliers 514 and provides the result to multiplier 518b.

Within control unit 520, the predicted pilot symbols, $\hat{x}_n$, are provided to a summer 524 and subtracted from the received pilot symbols, $x_n$, to provide prediction errors, $e_n^k$. A prediction error estimator 526 then receives the prediction errors, $e_n^k$, and derives prediction error estimates, $E_n^k$, based on a particular average response, as described above. The prediction error estimates, $E_n^k$, are then provided to a threshold detector 528, which compares each prediction error estimate against one or more thresholds, $Th_k$. Based on the results of the comparison, a specific filter response (e.g., a particular bandwidth) is selected and indicated by a Select signal from threshold detector 528. A coefficient storage unit 530 receives the Select signal and provides the set of filter coefficients for the selected filter response to IIR filter 510.

Pilot filter 236c in FIG. 5 includes only one filter 510, which has a response that may be adjusted periodically or whenever desired. The specific response to be used for filter 510 is dependent on the output (i.e., the pilot estimates) of the current filter response. Controller 160 or some other unit may be used to monitor the performance of pilot filter 236c and to "steer" the filter to the proper response.

Referring back to FIG. 2, each finger processor 210 of rake receiver 154a may be provided with a respective adaptive pilot filter 236, which may be implemented using various designs such as those shown in FIGS. 3 through 5. Each finger processor 210 is thus associated with a respective pilot filter having a response (e.g., a bandwidth) that may be selected based on the estimated channel conditions. This allows each finger processor 210 to utilize the specific filter response that best matches the channel conditions experienced by the multipath being processed by that finger processor. In this way, different and independent pilot filter responses may be used for different multipaths being concurrently processed by rake receiver 154a.

Non-pilot symbols may also be used along with pilot symbols to estimate the channel conditions and/or the channel response (i.e., amplitude and phase). The use of non-pilot data for channel estimation is especially advantageous for systems that transmit a non-continuous pilot in a time division multiplexed (TDM) manner. In fact, for some operating conditions applicable to a W-CDMA system, an improvement of up to 1.0 dB in the SNR for the pilot filter output may be achieved by incorporating non-pilot symbols in the pilot filter. The higher pilot SNR may provide improved system performance.

The adaptive pilot filtering techniques described herein can be used to provide an improved estimate of the time-varying response (i.e., amplitude and phase) of the communication channel, which may then improve receiver performance and system capacity. The response of the pilot filter (e.g., the filter bandwidth) may be adapted to match the channel conditions.

The adaptive pilot filtering techniques described herein may be used in various wireless communication systems that transmit a (continuous or non-continuous) pilot. Such systems include CDMA systems that implement various standards such as IS-95, cdma2000, IS-856, W-CDMA, and so on. The techniques described herein may be employed at the terminals to recover pilots transmitted on the forward link (i.e., downlink) from the base stations to the terminals. For certain systems, pilots are also transmitted on the reverse link (i.e., uplink) from the terminals to the base stations, in which case the techniques described herein may also be used at the base stations to recover the pilots transmitted from the terminals.

The adaptive pilot filter, rake receiver, and other receiver elements may be implemented in hardware, software, firmware, or a combination thereof. For a hardware design, the adaptive pilot filter and its associated control circuitry and/or the rake receiver may be implemented within a digital signal processor (DSP), an application specific integrated circuit (ASIC), a processor, a microprocessor, a controller, a microcontroller, a field programmable gate array (FPGA), a programmable logic device, other electronic unit, or any combination thereof. All or a portion of the adaptive pilot filter and its associated control circuitry and/or rake receiver may also be implemented in software or firmware executed by a processor (e.g., controller 160 in FIGS. 1 and 2). For example, the one or more FIR or IIR filters, the derivation of the pilot-to-noise power ratio, $SNR_n$, computation of the prediction error estimates, $E_n^k$, the threshold detection, and so on, may be implemented or performed with program codes executed by controller 160 or some other processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method, comprising:
   estimating one or more characteristics of a communication channel based on received pilot symbols; and
   filtering the received pilot symbols in accordance with a particular pilot filter response to provide filtered pilot symbols that comprise the pilot estimates, wherein the particular pilot filter response is selected from among a plurality of possible pilot filter responses associated with a plurality of different bandwidths based on the one or more estimated channel characteristics.

2. The method of claim 1, wherein the one or more estimated channel characteristics are indicative of noise in the communication channel.

3. The method of claim 1, wherein the one or more estimated channel characteristics are indicative of fading in the communication channel.

4. An apparatus, comprising:
   means for estimating one or more characteristics of a communication channel based on received pilot symbols; and
   means for filtering the received pilot symbols in accordance with a particular pilot filter response to provide filtered pilot symbols that comprise the pilot estimates, wherein the particular pilot filter response is selected from among a plurality of possible pilot filter responses associated with a plurality of different bandwidths based on the one or more estimated channel characteristics.

5. The apparatus of claim 4, wherein the one or more estimated channel characteristics are indicative of noise in the communication channel.

6. The apparatus of claim 4, wherein the one or more estimated channel characteristics are indicative of fading in the communication channel.

7. The apparatus of claim 4, further comprising:
   means for forming a predicted pilot symbol for a current received pilot symbol based on one or more received pilot symbols other than a current pilot symbol;
   means for determining a prediction error between the predicted pilot symbol and the current received pilot symbol; and
   means for selecting the particular pilot filter response from among the plurality of possible pilot filter responses based on one or more prediction errors for one or more received pilot symbols.

8. The apparatus of claim 7, further comprising:
   means for evaluating the prediction errors periodically; and
   wherein the selecting is performed periodically in conjunction with the evaluating.

9. The apparatus of claim 7, further comprising:
   means for comparing a value derived from the prediction errors against one or more thresholds, and wherein the particular pilot filter response is selected based on results of the comparing.

10. The apparatus of claim 4, wherein the filtered pilot symbols are used as pilot estimates for data symbols transmitted concurrently with the received pilot symbols.

11. The apparatus of claim 4, wherein a pilot filter response with a narrow bandwidth is selected if the one or more estimated channel characteristics indicate large amounts of noise in the communication channel.

12. The apparatus of claim 4, wherein a pilot filter response with a narrow bandwidth is selected if the one or more estimated channel characteristics indicate low fading in the communication channel.

13. The apparatus of claim 4, wherein the plurality of different bandwidths are approximately geometrically related.

14. The apparatus of claim 4, wherein the filtering is achieved with a finite impulse response (FIR) filter.

15. The apparatus of claim 4, wherein the filtering is achieved with an infinite impulse response (IIR) filter.

16. The apparatus of claim 4, wherein the plurality of possible pilot filter responses are derived from a plurality of sets of coefficients.

17. The apparatus of claim 4, wherein the received pilot symbols are obtained from a Code Division Multiple Access signal.

18. An apparatus comprising:
   means for estimating pilot power based on received pilot symbols;
   means for estimating noise power based on the received pilot symbols;
   means for deriving a pilot-to-noise power ratio based on the estimated pilot power and the estimated noise power;
   means for selecting, based on the pilot-to-noise power ratio, a particular filter response from among a plurality of possible filter responses associated with a plurality of different bandwidths; and
   means for filtering the received pilot symbols in accordance with the particular filter response to provide filtered pilot symbols.

19. The apparatus of claim 18, wherein the noise power is estimated based on differences between successive received pilot symbols.

20. The apparatus of claim 18, wherein the means for selecting the particular filter response comprises
   means for comparing the pilot-to-noise power ratio against one or more thresholds, and means for selecting the particular filter response from among the plurality of possible filter responses based on results of the comparing.

21. The apparatus of claim 18, further comprising:
means for forming a predicted pilot symbol for a current received pilot symbol based on one or more received pilot symbols other than a current pilot symbol;
means for determining a prediction error between the predicted pilot symbol and the current received pilot symbol; and
means for selecting the particular pilot filter response from among the plurality of possible pilot filter responses based on one or more prediction errors for one or more received pilot symbols.

22. The apparatus of claim 21, further comprising:
means for evaluating the prediction errors periodically; and
wherein the selecting is performed periodically in conjunction with the evaluating.

23. An adaptive pilot filter, comprising:
a filter operative to filter received pilot symbols in accordance with a particular pilot, filter response to provide filtered pilot symbols that comprise pilot estimates; and
a control unit coupled to the filter and operative to estimate, based on the received pilot symbols, one or more characteristics of a communication channel, and to select, based on the one or more estimated channel characteristics, the particular pilot filter response from among a plurality of possible pilot filter responses associated with a plurality of different bandwidths.

24. The adaptive pilot filter of claim 23, wherein the one or more estimated channel characteristics are indicative of noise in the communication channel.

25. The adaptive pilot filter of claim 23, wherein the one or more estimated channel characteristics are indicative of fading in the communication channel.

26. The adaptive pilot filter of claim 23, wherein the control unit is further operative to form a predicted pilot symbol for a current received pilot symbol based on one or more received pilot symbols other than a current pilot symbol, determine a prediction error between the predicted pilot symbol and the current received pilot symbol, and select the particular pilot filter response from among the plurality of possible pilot filter responses based on one or more prediction errors for one or more received pilot symbols.

27. The adaptive pilot filter of claim 26, wherein the control unit is further operative to evaluate the prediction errors periodically and select the particular pilot filter response periodically in conjunction with the evaluation.

28. The adaptive pilot filter of claim 26, wherein the control unit is further operative to compare a value derived from the prediction errors against one or more thresholds and select the particular pilot filter response based on the comparison results.

29. The adaptive pilot filter of claim 23, wherein the filtered pilot symbols are used as pilot estimates for data symbols transmitted concurrently with the received pilot symbols.

30. The adaptive pilot filter of claim 23, wherein a pilot filter response with a narrow bandwidth is selected if the one or more estimated channel characteristics indicate large amounts of noise in the communication channel.

31. The adaptive pilot filter of claim 23, wherein a pilot filter response with a narrow bandwidth is selected if the one or more estimated channel characteristics indicate low fading in the communication channel.

32. The adaptive pilot filter of claim 23, wherein the plurality of different bandwidths are approximately geometrically related.

33. The adaptive pilot filter of claim 23, wherein the filter is a finite impulse response (FIR) filter.

34. The adaptivepilot filter of claim 23, wherein the filter is an infinite impulse response (IIR) filter.

35. The adaptive pilot filter of claim 23, wherein the plurality of possible pilot filter responses are derived from a plurality of sets of coefficients.

36. The adaptive pilot filter of claim 23, wherein the received pilot symbols are obtained from a Code Division Multiple Access signal.

37. A terminal in a wireless communications system, comprising:
a receiver operative to receive pilot symbols for a pilot included in a modulated signal;
a filter operative to filter the received pilot symbols in accordance with a particular pilot filter response to provide filtered pilot symbols that comprise pilot estimates; and
a control unit coupled to the filter and operative to estimate, based on the received pilot symbols, one or more characteristics of a communication channel, and to select, based on the one or more estimated channel characteristics, the particular pilot filter response from among a plurality of possible pilot filter responses associated with a plurality of different bandwidths.

38. An adaptive pilot filter, comprising:
a filter operative to filter received pilot symbols in accordance with a particular pilot filter response to provide filtered pilot symbols; and
a control unit coupled to the filter and operative to estimate pilot power based on the received pilot symbols, estimate noise power based on the received pilot symbols, derive a pilot-to-noise power ratio based on the estimated pilot power and the estimated noise power, and select, based on the pilot-to-noise power rations, a particular pilot filter response from among a plurality of possible pilot filter responses associated with a plurality of different bandwidths.

39. The adaptive pilot filter of claim 38, wherein the noise power is estimated based on differences between successive received pilot symbols.

40. The adaptive pilot filter of claim 38, wherein the control unit is operative to compare the pilot-to-noise power ratio against one or more thresholds, and select the particular filter response from among the plurality of possible filter responses based on results of the comparing.

41. The adaptive pilot filter of claim 38, wherein the control unit is operative to form a predicted pilot symbol for a current received pilot symbol based on one or more received pilot symbols other than a current pilot symbol, determine a prediction error between the predicted pilot symbol and the current received pilot symbol, and select the particular pilot filter response from among the plurality of possible pilot filter responses based on one or more prediction errors for one or more received pilot symbols.

42. The adaptive pilot filter of claim 41, wherein the control unit is configured to evaluate the prediction errors periodically and select the particular pilot filter response periodically in conjunction with the evaluation.

* * * * *